Dec. 18, 1962     J. E. OWENS     3,068,528
METHOD FOR CONVEYING AND STRETCHING THERMOPLASTIC FILM
Filed May 3, 1960     2 Sheets-Sheet 1
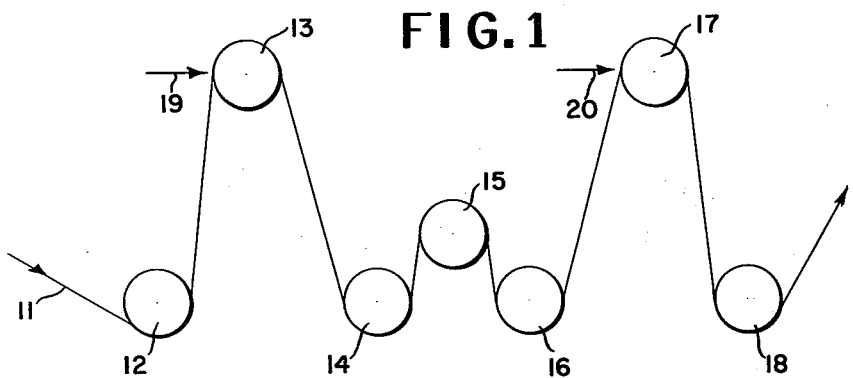
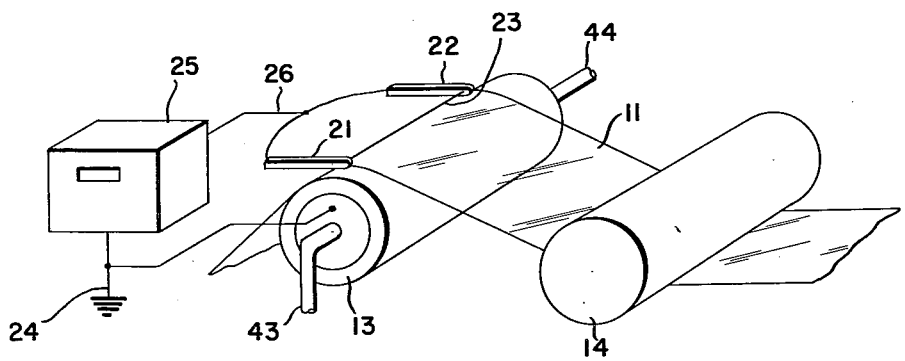
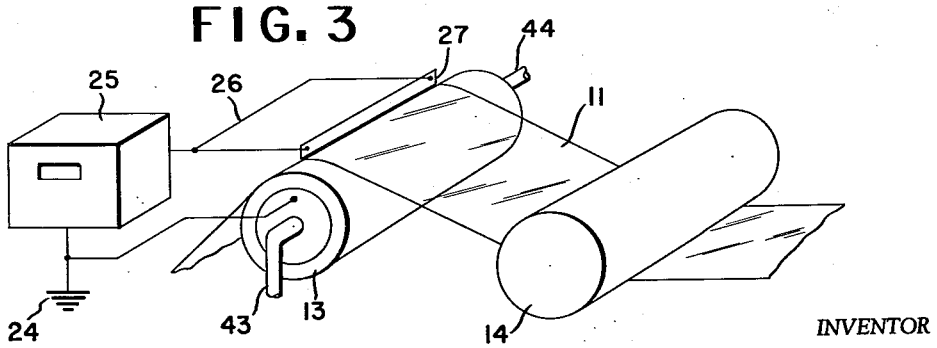
INVENTOR
JOHN EDWARD OWENS
BY *Herbert M. Wolfson*
ATTORNEY Dec. 18, 1962 J. E. OWENS 3,068,528
METHOD FOR CONVEYING AND STRETCHING THERMOPLASTIC FILM
Filed May 3, 1960 2 Sheets-Sheet 2

INVENTOR
JOHN EDWARD OWENS

BY *Herbert M Wolfson*
ATTORNEY

United States Patent Office 3,068,528
Patented Dec. 18, 1962

3,068,528
METHOD FOR CONVEYING AND STRETCHING THERMOPLASTIC FILM
John Edward Owens, Wilmington, Del., assignor to E. I. du Pont de Nemours and Company, Wilmington, Del., a corporation of Delaware
Filed May 3, 1960, Ser. No. 26,462
20 Claims. (Cl. 18—48)

This invention relates to conveying organic thermoplastic polymeric films for processing. More particularly, the invention relates to a continuous process for stretching a moving polymeric film.

In the treatment of organic thermoplastic polymeric film, it is necessary to transport the film over rolls, on belts, etc. For example, when stretching the film, a treatment serving to orient the film and thus to improve the properties of the film, the film may be passed from the nip of slowly rotating rolls to the nip of comparatively rapidly rotating rolls, the difference between the speeds of rotation of the two sets of rolls serving to stretch the film longitudinally. Alternatively, the film may be passed between moving belts or chains and held at its edges by clips that diverge upon movement of the belts or chains to stretch the film transversely. In the first case, longitudinal stretching, it is difficult to avoid "necking-in" (width reduction) of the film as it is stretched lengthwise. There is also a tendency for the film to weave back and forth transversely as it moves over idler rolls, that are customarily placed between the slowly rotating and rapidly rotating rolls, tending to produce a film that is wrinkled and of non-uniform thickness across its width. It is also difficult to maintain the surfaces of the rolls absolutely smooth; the result is that the more rolls that must be used, the more likely it is that the film will be defaced. In the second case, transverse stretching, it is necessary for the tenter clips to grasp a substantial amount of film at each edge for effective stretching. The result is a substantial amount of film that must be discarded when the clips are removed.

An object of the present invention is to overcome the difficulties encountered during both longitudinal and transverse stretching of organic thermoplastic polymeric film. Another object is to provide novel means by which organic thermoplastic polymeric film can be made to adhere securely to a moving surface. Still another object is to provide a process wherein improved heat transfer is obtained between a film and a moving surface, the surface being at a temperature different than that of the film. Other objects will appear hereinafter.

The objects are accomplished by passing the organic thermoplastic polymeric film onto an electrically grounded moving surface; depositing on the upper surface of the film in a continuous and uniform manner an electrostatic charge sufficient to cause the film to adhere firmly to the moving surface. Preferably, the objects are accomplished by passing the organic thermoplastic polymeric film onto an electrically grounded moving surface; depositing an electrical charge of at least 0.23 microcoulomb per square inch on the upper surface of the film at least adjacent to each side edge of the film, preferably along a line or band across the complete width of the film, in a continuous and uniform manner whereby the film is caused to adhere firmly to the moving surface.

For longitudinal stretching, the process comprises passing the organic thermoplastic polymeric film onto a first electrically grounded rotating roll; depositing an electric charge of at least 0.23 microcoulomb per square inch on the upper surface of the film at least adjacent to each side edge of the film in a continuous and uniform manner prior to a point where the film is stretched; and, thereafter, drawing the film from the first rotating roll at a linear speed greater than the speed of rotation of the roll, preferably by passing the film onto a second electrically grounded rotating roll, the second roll rotating at a higher linear speed than the first roll, and depositing an electrical charge of at least 0.23 microcoulomb per square inch on the upper surface of the film at least adjacent to each side edge of the film in a continuous and uniform manner to cause the film to adhere firmly to the second roll.

For transverse stretching, the process comprises passing the organic thermoplastic polymeric film onto two parallel electrically grounded moving belts or chains, the two belts or chains in side-by-side relationship; depositing an electric charge of at least 0.23 microcoulomb per square inch on the upper surface of the film at least adjacent to each side edge of the film in a continuous and uniform manner prior to a point where the film is stretched; diverging the two moving belts or chains starting at a point after which the electric charge is deposited on the film to stretch the film transversely.

It should be understood that the electrically grounded moving surface (roll, belt or chain) may actually be a polyethylene-coated or other plastic-coated surface or a surface finished with a non-conductive aluminum oxide or other oxide coating. In these cases, one might regard the coating on the metallic surface and the polymeric film passing thereover as a single insulator. The total thickness of such insulator (coating plus film) should be no greater than about 150 mils for effective operation. Thus, where the electrically grounded moving surface is an uncoated metallic roll, belt or chain, the thickness of the film may be up to about 150 mils. For most films, however, where the thickness of the film before being stretched is no greater than about 25 mils, the roll, belt or chain could be a grounded electrical conductor with a thin non-conductive coating of up to about ⅛ inch (125 mils). Of course, the thinner the insulator the more efficient the pinning obtained of the film to the surface. The thinnest film operable in the present invention is determined by practical considerations. It is difficult to process films in accordance with the present invention where the thickness of the film is less than ¼ mil.

The process provides several advantages. It permits stretching film longitudinally between rolls while minimizing the reduction in the width of the film. It permits longitudinal stretching without the necessity of passing the film between the nip of at least two sets of rotating rolls; a total of only two rolls could suffice. The process permits transverse stretching without causing waste film at the edges. In prior heat-treating processes, there was a tendency for the film surface nearest the heated surface to come to the desired temperature before the remainder of the film. Because of the intimate contact between film and the heated surface achieved by the process of the present invention, the transfer of heat to the complete thickness of the film is substantially improved. The result is that it is possible to heat the surface and the complete thickness of the film to a single elevated temperature simultaneously. The efficient heat transfer obtained by this process also enables one to use lower temperatures for heating than had previously been possible. This serves to increase even further the efficiency of any heat treatment. Similar advantages would accrue in a cooling process.

In addition to more efficient heat transfer, the process also serves to eliminate any entrapment of air between the film and the surface to which the film is pinned. Entrapment of air has been a troublesome source of non-uniformities in the ultimate film. By using the electrostatic charge specified in accordance with the process of the present invention, very intimate contact between the film and the surface is obtained. The result is that air is either not entrapped or, if entrapped, squeezed out before the film has progressed over the moving surface to any substantial degree.

To obtain the deposition of at least 0.23 microcoulomb per square inch, preferably no more than 3.91 microcoulombs per square inch for polyethylene terephthalate film[1], several critical requirements must be followed:

(1) A positive or negative current, but not both, must be used. A direct current (D.C.) voltage supply is generally used for this purpose. It is also possible to use a pulsating supply superimposed on a D.C. supply if the polarity of the resultant current does not undergo any change; i.e., remains either positive or negative.

(2) A non-uniform electrostatic field gradient must be established between the distributor of electricity (the electrode) and the grounded roll or belt over which the film passes so that the field is substantially higher immediately adjacent to the electrode than immediately adjacent to the film on the roll or belt. Specifically, the electrostatic field gradient in the vicinity of the electrode must be sufficient to ionize the medium (usually air) in that region, i.e., it must be at least 30,000 volts/centimeter for air. In the vicinity of the film, the electrostatic field must be below 30,000 volts/centimeter to prevent ionization of the air. Ionization of the air in the region near the film will tend to affect the film adversely, perhaps even charring the film.

(3) The current measured adjacent to the film must be correlated with the speed of the film so that the current is at least 5 microamperes/square yard of film on which the deposit of electrostatic charge is sought/minute.

The non-uniform electrostatic field gradient is obtained by a critical design of the electrode. The design should be such that a uniform surface is presented to the film, the surface containing no more than 0.39 square inch (0.125 inch in diameter) per linear inch of the electrode, preferably no more than 0.015 square inch per linear inch of the electrode, the surface area measured in a plane through the extremities of the electrode. More accurately, this area of the electrode that is "seen" by the film is measured as a projected area on the plane through the electrode's extremities nearest the film. The maximum preferred surface may be obtained by using a substantially cylindrical electrode such as at least one fine wire of up to 0.125 inch diameter or a knife edge having a radius of curvature of up to 0.005 inch. Theoretically, there is no precise minimum surface that can be specified for the electrode, below which one cannot produce the non-uniform electrostatic field gradient. However, a surface of less than 0.0016 square inch per linear inch for a wire electrode is not sufficiently durable to be practical in the present invention and, in general, a minimum of 0.003 square inch per linear inch is preferred. A knife edge electrode could be sharper (have a finer diameter) than a wire electrode while retaining adequate strength. The most effective electrode is a fine wire having a diameter of 1–20 mils.

The D.C. voltage supply must be capable of producing very low current, on the order of 5–240 microamperes per square yard per minute at a voltage of 2–30 kilovolts. The minimum of 2 kilovolts has been found necessary to provide the proper electrostatic field gradient of at least 30,000 volts per centimeter for air at the surface of the critical electrode where the distance between the electrode and the film approaches 0.06 inch and the film speed approaches a minimum of 2 feet per minute. The amount of voltage necessary in any particular case is that required to deposit initially at least 0.23 microcoulomb per square inch of material but less than an amount that would cause breakdown of the material. Under ideal conditions, i.e., no leakage of current from the film by conduction, the value that would cause breakdown of polyethylene terephthalate film would be 3.91 microcoulombs per square inch. The voltage necessary will depend on the speed of the film as it passes the electrode, the distance of the electrode from the surface of the film and the effectiveness of the particular electrode configuration. Generally, the speed of the film may vary anywhere from a few feet per minute to 500 yards per minute or higher and the distance between the electrode and the film may be anywhere from 0.0625 to 5 inches, preferably 0.5 to 1.5 inch.

The density of electrostatic charge that will cause breakdown of a dielectric material such as the thermoplastic organic polymeric films used in the present invention may be calculated from the following formula:

$$\text{Maximum charge density (microcoulombs) (square inch)} = \sigma_c K_e E$$

wherein $\sigma_o$ is the permittivity of free space in microcoulombs$^2$/newton-square inch;

$K_e$ is the dielectric constant of the material;

$E$ is the dielectric strength in newtons/microcoulomb and normally depends on thickness of the material.

In the following table are the maximum allowable charge densities before breakdown for some representative materials:

TABLE I

| Material | Thickness (mils) | Dielectric strength (newtons per microcoulomb) | Dielectric constant at 100 cycles per second and 20° C. | Maximum charge density (microcoulombs per sq. inch) |
|---|---|---|---|---|
| Polyethylene terephthalate | 1 | 217 | 3.16 | 3.91 |
| Polyethylene | 1 | 158 | 2.20 | 1.98 |
| Polyvinyl chloride | 1 | 120 | 3.95 | 2.70 |
| Polyvinyl chloride/Vinyl chloride | 1 | 158 | 5.16 | 4.65 |
| Polystyrene | 1 | 195 | 2.41 | 2.88 |
| Vinyl chloride/Vinyl acetate | 1 | 158 | 2.89 | 2.60 |
| Rubber hydrochloride | 0.8 | 96 | 4.85 | 2.65 |
| Copolymer of tetrafluoroethylene and hexafluoropropylene | 1 | 158 | 2.1 | 1.89 |
| Copolymer of ethylene terephthalate and neopentyl terephthalate | 3.6 | 128 | 3.38 | 2.47 |

Besides applying to those materials in the above table, the present invention is applicable to all polymeric materials that are or can be processed as films on moving surfaces. Such materials include all varieties of vinyl polymers, polyamides including nylon, polyesters, polytetrafluoroethylene, etc., and copolymers thereof. Films of regenerated cellulose and cellulosic derivatives can also be processed by the present invention.

The invention will be more fully described with reference to the accompanying drawing wherein FIGURE 1 is a schematic view of longitudinal stretching using the process of this invention;

FIGURE 2 is a view in perspective of one mode of carrying out the essential step of the process of this invention;

FIGURE 3 is a view in perspective of another mode of carrying out the essential step of the process of this invention;

Figure 4:
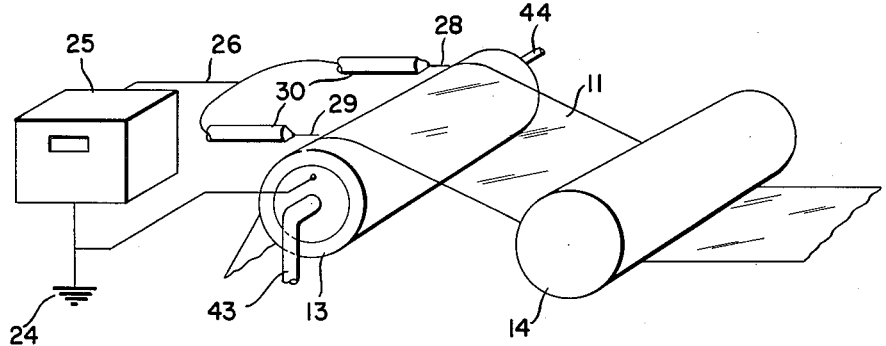
FIGURE 4 is a view in perspective of another mode of carrying out the essential step of the process of this invention.

Referring to FIGURES 1 and 2, an organic thermo-

---

[1] This value may be exceeded when the film is at elevated temperatures due to leakage of current from the film via conduction. The conductivity of the film is a function of temperature.

plastic polymeric film 11, such as polyethylene terephthalate film or polyethylene film, is first passed over positively-driven rolls 12 and 13, driven by means not shown at a relatively slow speed. From these "slow" rolls, the film passes over three closely spaced idler rolls 14, 15 and 16 and then over two positively-driven "fast" rolls 17 and 18. Stretching actually occurs between the last slow roll and the first idler roll. The extent of longitudinal stretching is dependent upon the difference in linear speeds of the positively-driven slow rolls and fast rolls. All the rolls are usually internally heated (by any convenient expedient, not shown) and maintained within any desired temperature range. Although a total of only seven rolls is shown in FIGURE 1, it should be understood that any number of rolls may be used and that, in actual practice, a total of 10–20 rolls are used.

Immediately prior to the point at which the polymeric film 11 first touches the last of the slow rolls 13 and the first of the fast rolls 17 are disposed electrodes 19 and 20. As shown in FIGURE 2, each electrode may be a wire electrode 23 having a diameter of 0.001–0.125 inch and made of tempered steel. Any other metallic conductor having adequate strength and dimensional stability may be employed as the electrode. Such materials include tungsten, "Inconel" — a nickel-iron alloy, "Monel"—a nickel alloy, copper, brass, stainless steel, etc. Each wire electrode is supported by insulated electrode supports 21 and 22. The D.C. power supply 25 and the rolls 13 (and 17 not shown) are grounded at 24. Sufficient voltage which is usually between 15 and 30 kilovolts is supplied from the D.C. power supply 25 through the high voltage supply cable 26 to the wire electrode 23 to provide at least 0.23 microcoulomb per square inch on the upper surface of the film and thus to force the film 11 into intimate contact with the positively-driven rolls.

The only difference from the above-described arrangement in FIGURE 3 lies in substituting a knife edge 27 for the wire 23 of FIGURE 2.

In FIGURE 4, two electrodes 28 and 29 in the form of needle probes are used in place of the electrodes of the previous figures. The probes are composed of high conducting metal rods honed to a sharp point. The radius at the points of the probes may vary anywhere from 0.001–0.125 inch. In all other respects, FIGURE 4 is identical to FIGURES 2 and 3. The arrangement shown in FIGURE 4 is particularly suited to conveying and processing light gauge films having a thickness of less than 75 mils. Each electrostatic probe is composed of the essential metal rod 28 or 29 inserted in a silicone glass tube 30 and the combination is held in place by supports not shown. The high voltage cable 26 from the power supply 25 is connected to the metal rod 28 or 29 by a conventional banana jack and plug, not shown. It should be understood that the roll 13 in FIGURES 2, 3 and 4 may be heated or cooled by passing fluid through the roll. The inlet and outlet for such heating or cooling fluid are shown at 43 and 44, respectively.

Figure 5:
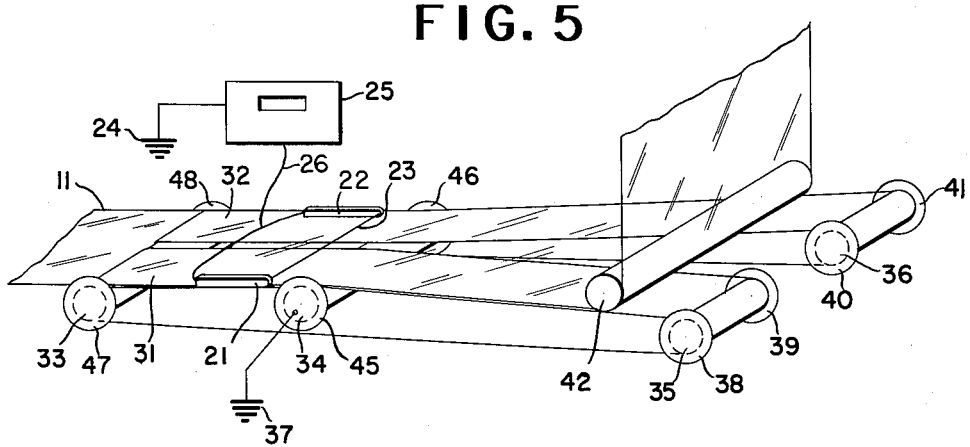
FIGURE 5 is a view in perspective of transverse stretching using the process of the present invention.

The transverse stretching apparatus in FIGURE 5 is illustrated as operating with a wire electrode similar to that shown in FIGURE 2. However, any of the previously shown electrode configurations would operate equally well. In this apparatus, the film 11 is led over two endless electrically conductive belts 31 and 32 adapted to be propelled by four positively-driven rolls 33—36. It should be understood that metal chains or the like may be used instead of the electrically conducting belts shown in FIGURE 5 without altering the operation of the process. The film 11, as it passes to roll 34, is subjected to a voltage sufficient to deposit a charge of at least 0.23 microcoulomb per square inch on the surface of the film at points adjacent to the side edges of the film from the wire electrode 23. The D.C. power supply 25 and the roll 34 are grounded at 24 and 37, respectively. As the belts 31 and 32 are made to diverge by the use of flanges 38 and 39 on roll 35 and flanges 40 and 41 on roll 36, the film is stretched transversely. Flanges 45 and 46 on roll 34 and flanges 47 and 48 on roll 33 prevent premature stretching of the film and align the film on the belts. The apparatus may be adapted to regulate the temperature of the film during this stretching process by using a suitable enclosure and inlets for cooled or heated air known to those skilled in the art. After being stretched, the film 11 is led by positively-driven roll 42 to the next step of the process.

The invention will be more clearly understood by referring to the examples which follow. These examples are merely illustrations of the invention and should not be considered limitative thereof.

*Example 1*

Substantially amorphous polyethylene terephthalate film, 0.005 inch thick, was stretched in the longitudinal direction on a stretching device similar to that shown in FIGURE 1. The device consisted of four slow rolls, two idler rolls and five fast rolls. The temperature of the slow rolls was maintained at 95° C. The idler rolls were maintained at 85° C. and the fast rolls, at 70° C.

A 6-mil diameter tempered steel wire, approximately 17 inches long was stretched tautly 1 inch above the surface of the polyethylene terephthalate film as the film contacted the last slow roll. The film was 15⅛ inches wide at this point. The ends of the insulating supports were enclosed in heavy rubber tubing and supported by two burette clamps. A small diameter polytetrafluoroethylene-covered wire connected the wire electrode to the positive terminal of the direct current power supply. The negative terminal of the power supply and this last slow roll were grounded. A D.C. voltage of 14 kilovolts was impressed on the wire and a current of 75 microamperes per square yard per minute was impressed on the film. A similar electrostatic charging apparatus was placed over the electrically grounded first fast roll. The speed of the fast rolls compared to the speed of the slow rolls was sufficient to stretch the film 4.0 times its original length. The film passing from the last fast roll was a clear, uniform film having a width of 12⅜–12⅞ inches.

As a control, the apparatus in Example 1 was used without the electrostatic charging device to stretch the film 4.0 times its original length. The temperatures of the slow rolls, idler rolls and fast rolls were also 95° C., 85° C. and 70° C., respectively. The resulting film necked in from the 15⅛ inch starting width to 10¼–11¾ inches and did not have the excellent appearance of the film of the example.

*Example 2*

Polyethylene terephthalate film, 0.001" thick and 19⅜" wide, was stretched in the longitudinal direction on a stretching device similar to that shown in FIGURE 1. The specific apparatus used consisted of five driven slow rolls maintained at a temperature of 85° C.–95° C., followed by five idler rolls at a temperature of 40° C.–60° C., then five driven fast rolls at room temperature and finally one idler roll, each roll spaced not more than a few inches from the roll previous to it. The fast rolls were driven at a speed of 18 yards per minute and the slow rolls, at a speed of 6 yards per minute. A 6-mil diameter steel wire was situated 3" from the line of tangency of the film with the last slow roll, the fifth roll. This roll was electrically grounded. A D.C. voltage of 11 kilovolts impressed on the wire serve to provide a current of 240 microamperes to the film (3.45 microcoulombs per square inch) to pin the film firmly to the roll. Despite the longitudinal stretch of three times the original length of the film, a clear, uniform film suffering from comparatively little reduction in width (neck-in) resulted. The final film width was 18½".

Example 3

This example illustrates heat-setting polyethylene terephthalate film by using the present invention in combination with conventional nip rolls.

A polyethylene terephthalate film, extruded and quenched in the usual manner and stretched transversely 3.4 times its initial width, was passed through the nip of a first set of rolls at a temperature of 85° C. From the first set of rolls, the film passed to the nip of a second set of rolls maintained at a temperature of 169° C. and rotated at a speed 3.3 times the speed of the first set of rolls. The top roll of each set of nip rolls was covered with silicone rubber and the bottom rolls were made of steel.

The two-way stretched film, 66" wide, was then passed at a speed of 68 yards per minute under a steel idler roll and onto a metal heat-setting roll maintained at a temperature of 220° C. Immediately prior to the line at which the film touched this roll, a 6-mil diameter tempered steel wire was disposed across the complete width of the film and one inch from its surface. A D.C. voltage of 20 kilovolts was impressed on the wire which caused a current of 1 milliampere to flow to the film. This served to deposit a charge of about 0.37 microcoulomb per square inch of film. The film, pinned firmly to the heat-setting roll, was next led between a third set of nip rolls maintained at a temperature of about 70° C. where the film was quenched. An oriented, heat-set film having an excellent appearance and the following properties was obtained:

|  | Longitudinal | Transverse |
| --- | --- | --- |
| Tensile strength (p.s.i.) | 25,000 | 26,000 |
| Tensile modulus (p.s.i.) | 730,000 | 620,000 |
| Percent elongation | 56 | 122 |
| Dimensional stability at 200° C., percent | 4.5 | 4.6 |
| Haze level | 0.009 | |

In a control run, the electrostatic arrangement for pinning the film to the heat-setting roll was omitted and a rubber covered roll was used in its stead. The stretching steps and the heat-setting step were carried out in a manner identical to the example. The properties of the resulting biaxially oriented, heat-set polyethylene terephthalate film were substantially those of the example except for the haze level. The haze level had risen to 0.019.

Example 4

This example illustrates that it is not necessary to place idler rolls between the slow and fast rolls for successful longitudinal stretching in accordance with the present invention. A polyethylene terephthalate film, 0.001" thick and 20" wide, after extrusion and quenching in the usual manner, was passed around a series of five relatively slowly driven rolls maintained at a temperature of about 85° C. The speed of rotation was six yards per minute. As the film reached the last of these rolls, a 6-mil diameter wire disposed across the width of the film and about 3" from the surface of the film served to pin the film to the roll. A D.C. voltage of 11 kilovolts provided a current of 500 microamperes from the wire to the film, i.e. about 75 microamperes/square yard/minute or 3.48 microcoulombs per square inch of film.

The film was then led over a first fast roll rotating at a speed of 24 yards per minute and maintained at a temperature of 60° C. A second electrostatic wire probe arrangement was disposed 3" from the surface of the film as the film contacted this fast roll. The D.C. voltage used was 13 kilovolts, providing a current of 500 microamperes, i.e. 37.5 microamperes/square yard/minute or 1.74 microcoulombs per square inch, to pin the film to the fast roll. The film then passed over an idler roll and then around six more driven fast rolls before being led to the windup operation. The difference in speeds between the fast rolls and the slow rolls served to stretch the film 4.0 times its original length. The resulting stretched film had an excellent appearance, free of scratches or any other surface abnormalities.

Example 5

This example illustrates a utility for the present invention in the manufacture of regenerated cellulose film.

The commercial method of continuously manufacturing regenerated cellulose film from viscose is disclosed in U.S. Patents 1,548,864 and 1,601,289 to Brandenberger. In this process, viscose is forced through an elongated orifice into a coagulating bath to form a continuous film. The freshly coagulated viscose film is then regenerated, washed, desulfured, bleached, softened and dried. The dried film is wound into mill rolls for convenience in handling, storing and processing. Up through the softening stage, the regenerated cellulose film is in a gel condition, i.e. completely saturated with aqueous solution. The gel film contains an amount of water that is about 3.0-3.5 times the weight of the dry cellulose. The moisture is removed in the drying operation. During drying, the film shrinks in length, width and thickness and tends to become puckered and wrinkled. To prevent puckering, wrinkling and the like, and the excessive loss of material due to shrinking, the film is usually passed about a series of heated rolls, such as those described in U.S. Patents 2,000,079 to Herndon and 2,141,377 to Chylinski, operated at speeds which maintain the film under sufficient tension to minimize the decrease in area and the deformation of the film surface. After reaching the desired moisture content in the drying operation, the regenerated cellulose film is wound up in large mill rolls which may be slit directly into rolls of narrower width or coated with various compositions before being slit.

In a specific example of the prior art, the control, a film 60 inches wide was dried by passing through a drier at a speed of approximately 87 yards per minute until the average moisture content of the film was reduced to approximately 40%. At this point, the speed of the drier rolls was gradually increased in small increments over a span of 8 lower rolls until the speed reached 88 yards per minute and the film contained approximately 15% moisture. This speed was maintained until the final moisture content of 6.7% was reached. The dried regenerated cellulose film, approximately .0009" thick, was then wound into a large diameter mill roll. The approximate diameter of the drier rolls was 11 inches and their surface temperature was approximately 160° F. The finished mill rolls were then slit into smaller width rolls and examined for sheet flatness (pull-out), streaks and beads.

In the example, the identical casting machine was equipped with eight 6-mil diameter wires, one of which was placed across the width of the film and one inch directly below each of the eight accelerating rolls. The rolls were grounded and a D.C. voltage of 9.5 kilovolts was impressed on the wire. This voltage provided a current of 1000 microamperes. At the speed of 88 yards per minute, this current served to place a charge of 0.32 microcoulomb per square inch of film and caused the film to adhere securely to the drier rolls. The resulting mill rolls were slit into rolls of narrower width and flatness or pull-out and the other qualities of the film were determined. The results of these determinations are presented in the following table:

TABLE II

|  | Control | Example 5 |
| --- | --- | --- |
| Percent rejected for high beads | 4.6 | 0.3 |
| Percent rejected for streaks | 0.4 | 0.0 |
| Percent rejected for pull-out | 2.5 | 0.3 |
| Total percent rejected | 7.5 | 0.6 |

The invention finds wide applicability in the field of polymeric films. It is useful for stretching polymeric films longitudinally and transversely, heat-treating or drying such films, heat-setting such films and, in short, for transporting such films wherever improved gripping action is desired. It should also be noted that the improved heat transfer efficiency obtained by the process of the invention permits one to use fewer heat transfer rolls than heretofore to attain a given elevated temperature.

Having fully disclosed the invention, what is claimed is:

1. A process for stretching an organic thermoplastic polymeric film which comprises passing the organic thermoplastic polymeric film in proximity to but out of contact with at least one electrode and then onto an electrically grounded moving surface; establishing a non-uniform electrostatic field gradient between said electrode and the film to deposit on the upper surface of said film prior to a point where said film is stretched an electrostatic charge sufficient to cause said film to adhere firmly to said moving surface and drawing said film from said surface at a speed greater than the speed of the moving surface.

2. A process for stretching an organic thermoplastic polymeric film which comprises passing the organic thermoplastic polymeric film in proximity to but out of contact with at least one electrode and then onto an electrically grounded moving surface; establishing a non-uniform electrostatic field gradient between said electrode and the film to deposit in a continuous and uniform manner at least 0.23 microcoulomb per square inch on the upper surface of said film at least adjacent to each side of said film prior to a point where said film is stretched to cause said film to adhere firmly to said moving surface and drawing said film from said surface at a speed greater than the speed of the moving surface.

3. A process for stretching an organic thermoplastic polymeric film which comprises passing the organic thermoplastic polymeric film in proximity to but out of contact with at least one electrode and then onto an electrically grounded moving surface; establishing a non-uniform electrostatic field gradient between said electrode and the film to deposit in a continuous and uniform manner at least 0.23 microcoulomb per square inch along a line on the upper surface of said film, the line extending across the width of said film, prior to a point where said film is stretched whereby said film is caused to adhere firmly to said moving surface and drawing said film from said surface at a speed greater than the speed of the moving surface.

4. A process as in claim 2 wherein said organic thermoplastic polymeric film is polyethylene terephthalate film.

5. A process as in claim 2 wherein said organic thermoplastic polymeric film is polyethylene terephthalate film and the electrostatic charge deposited on the upper surface of the film is between 0.23 and 3.91 microcoulombs per square inch.

6. A process as in claim 2 wherein said organic thermoplastic polymeric film is polyethylene film.

7. A process for stretching an organic thermoplastic polymeric film which comprises passing the organic thermoplastic polymeric film onto an electrically grounded moving surface; passing said film 0.0625–5 inches from the extremities of an electrode closest to said film, said electrode disposed across the width of said film prior to a point where said film is stretched, said electrode having a surface area of 0.0016–0.39 square inch per linear inch of electrode, said surface area measured in a plane through said extremities of said electrode; impressing a voltage of 2–30 kilovolts on said electrode whereby said film is caused to adhere firmly to said moving surface; and drawing said film from said surface at a speed greater than the speed of the moving surface.

8. A process for stretching an organic thermoplastic polymeric film which comprises passing the organic thermoplastic polymeric film onto an electrically grounded moving surface; passing said film 0.5–1.5 inches from the extremities of an electrode closest to said film, said electrode disposed across the width of said film prior to a point where said film is stretched, said electrode having a surface area of 0.003–0.015 square inch per linear inch of electrode, said surface area measured in a plane through said extremities of said electrode; impressing a voltage of 2–30 kilovolts on said electrode whereby said film is caused to adhere firmly to said moving surface; and drawing said film from said surface at a speed greater than the speed of the moving surface.

9. A process as in claim 8 wherein the electrode is a fine wire having a diameter of 1–20 mils.

10. A process as in claim 8 wherein the electrode is a knife edge having a radius of curvature of up to 0.005 inch.

11. A process as in claim 8 wherein the film is polyethylene terephthalate film.

12. A process as in claim 8 wherein the film is polyethylene film.

13. A process for transporting an organic thermoplastic polymeric film which comprises passing the organic thermoplastic polymeric film in proximity to but out of contact with at least one electrode and then onto an electrically grounded moving surface; establishing a non-uniform electrostatic field gradient between said electrode and the film to deposit on the upper surface of said film an electrostatic charge sufficient to cause said film to adhere firmly to said moving surface.

14. A process for transporting an organic thermoplastic polymeric film which comprises passing the organic thermoplastic polymeric film in proximity to but out of contact with at least one electrode and then onto an electrically grounded moving surface; establishing a non-uniform electrostatic field gradient between said electrode and the film to deposit in a continuous and uniform manner at least 0.23 microcoulomb per square inch on the upper surface of said film at least adjacent to each side of said film to cause said film to adhere firmly to said moving surface.

15. A process for stretching an organic thermoplastic polymeric film which comprises passing the organic thermoplastic polymeric film in proximity to but out of contact with at least one electrode and then onto two electrically grounded moving surfaces, said moving surfaces disposed in side-by-side relationship; establishing a non-uniform electrostatic field gradient between said electrode and the film to deposit on the upper surface of said film an electrostatic charge sufficient to cause said film to adhere firmly to both of said moving surfaces and diverging said moving surfaces to stretch said film transversely.

16. A process for stretching an organic thermoplastic polymeric film which comprises passing the organic thermoplastic polymeric film in proximity to but out of contact with at least one electrode and then onto two electrically grounded moving surfaces; establishing a non-uniform electrostatic field gradient between said electrode and the film to deposit in a continuous and uniform manner at least 0.23 microcoulomb per square inch on the upper surface of said film at least adjacent to each side of said film to cause said film to adhere firmly to said moving surfaces; and diverging said moving surfaces to stretch said film transversely.

17. A process for transporting an organic thermoplastic polymeric film which comprises passing the organic thermoplastic polymeric film onto an electrically grounded moving surface; passing said film 0.0625–5 inches from the extremities of an electrode closest to said film, said electrode disposed across the width of said film prior to a point where said film is to adhere to said moving surface, said electrode having a surface area of 0.0016–0.39 square inch per linear inch of electrode, said surface area measured in a plane through said extremities of said electrode; impressing a voltage of 2–30 kilovolts on said electrode whereby said film is caused to adhere firmly to said moving surface.

18. A process for transporting an organic thermoplastic polymeric film which comprises passing the organic thermoplastic polymeric film onto an electrically grounded moving surface; passing said film 0.5–1.5 inches from the extremities of an electrode closest to said film, said electrode disposed across the width of said film prior to a point where said film is to adhere to said moving surface, said electrode having a surface area of 0.003–0.015 square inch per linear inch of electrode, said surface area measured in a plane through said extremities of said electrode; impressing a voltage of 2–30 kilovolts on said electrode whereby said film is caused to adhere firmly to said moving surface.

19. A process as in claim 18 wherein the electrode is a fine wire having a diameter of 1–20 mils.

20. A process as in claim 18 wherein the electrode is a knife edge having a radius of curvature of up to 0.005 inch.

References Cited in the file of this patent

UNITED STATES PATENTS

| | | |
|---|---|---|
| 705,691 | Morton | July 29, 1902 |
| 1,918,848 | Land et al. | July 18, 1933 |
| 1,975,504 | Formhals | Oct. 2, 1934 |
| 2,185,417 | Norton | Jan. 2, 1940 |
| 2,293,165 | Norton | Aug. 18, 1942 |
| 2,576,882 | Koole et al. | Nov. 27, 1951 |
| 2,810,426 | Till et al. | Oct. 22, 1957 |
| 2,823,421 | Scarlett | Feb. 18, 1958 |
| 2,896,263 | Frederick et al. | July 28, 1959 |

Disclaimer 3,068,528.—*John Edward Owens,* Wilmington, Del. METHOD FOR CONVEYING AND STRETCHING THERMOPLASTIC FILM. Patent dated Dec. 18, 1962. Disclaimer filed May 14, 1970, by the assignee, *E. I. du Pont de Nemour & Company.*

Hereby enters this disclaimer to claim 13 of said patent.

[*Official Gazette August 18, 1970.*]

Disclaimer and Dedication 3,068,528.—*John Edward Owens*, Wilmington, Del. METHOD FOR CONVEYING AND STRETCHING THERMOPLASTIC FILM. Patent dated Dec. 18, 1962. Disclaimer and dedication filed Nov. 11, 1971, by the assignee, *E. I. du Pont de Nemours and Company*.

Hereby enters this disclaimer to all remaining claims in said patent and dedicates said patent to the Public.

[*Official Gazette March 7, 1972.*]